(12) United States Patent
Abe

(10) Patent No.: US 10,430,678 B2
(45) Date of Patent: Oct. 1, 2019

(54) BIOMETRIC INFORMATION PROCESSING DEVICE, BIOMETRIC INFORMATION PROCESSING METHOD AND NON-TRANSITORY COMPUTER-READABLE RECORDING MEDIUM

(71) Applicant: FUJITSU LIMITED, Kawasaki-shi, Kanagawa (JP)

(72) Inventor: Narishige Abe, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 147 days.

(21) Appl. No.: 15/471,676

(22) Filed: Mar. 28, 2017

(65) Prior Publication Data

US 2017/0344839 A1    Nov. 30, 2017

(30) Foreign Application Priority Data

May 27, 2016 (JP) .................................. 2016-106534

(51) Int. Cl.
*G06K 9/00* (2006.01)
*G06K 9/46* (2006.01)

(52) U.S. Cl.
CPC ..... *G06K 9/00892* (2013.01); *G06K 9/00067* (2013.01); *G06K 9/00087* (2013.01); *G06K 9/4604* (2013.01); *G06K 2009/00932* (2013.01)

(58) Field of Classification Search
CPC ........... G06K 9/00892; G06K 9/00087; G06K 9/00067; G06K 9/4604; G06K 2009/00932

USPC ................................................... 382/116–125
See application file for complete search history.

(56) References Cited

U.S. PATENT DOCUMENTS

| 10,019,618 B2* | 7/2018 | Matsunami ........ G06K 9/00013 |
| 2012/0281890 A1 | 11/2012 | Kamakura et al. |
| 2015/0020181 A1 | 1/2015 | Iwata |
| 2015/0186708 A1* | 7/2015 | Katz .................. G06K 9/00087 382/115 |
| 2015/0248575 A1 | 9/2015 | Yamada et al. |

FOREIGN PATENT DOCUMENTS

| EP | 2833294 A2 | 2/2015 |
| EP | 3007100 A1 | 4/2016 |
| JP | 2004-54698 | 2/2004 |
| JP | 2010-152706 | 7/2010 |
| JP | 2012-234440 | 11/2012 |
| WO | 2013-136553 | 9/2013 |

OTHER PUBLICATIONS

Zhang, et al. (Online joint palmprint and palmvein verification), Expert Systems with Applications, pp. 1-11. (Year: 2010).*

(Continued)

*Primary Examiner* — Daniel G Mariam
(74) *Attorney, Agent, or Firm* — Fujitsu Patent Center

(57) ABSTRACT

A biometric information processing device including: a memory; a processor coupled to the memory and the processor configured to: extract a surface pattern and a blood vessel pattern of a living body from a biometric image; extract a feature point of the surface pattern; and extract a feature of the blood vessel pattern corresponding to a position of the feature point.

12 Claims, 8 Drawing Sheets

(56) References Cited

OTHER PUBLICATIONS

Zhang, et al. (Palm Vein Extraction and matching for Personal Authentication), Springer, pp. 154-164. (Year: 2007).*
Extended European Search Report dated Sep. 27, 2017 for corresponding European Patent Application No. 17163551.9, 6 pages.
Trabelsi, Randa Boukhris et al.,"A Bi-Modal Palmvein Palmprint Biometric Human Identification based on Fusing new CDSDP Features", 2015 International Conference on Advances in Biomedical Engeering (ICABME), IEEE, Sep. 16, 2015, pp. 1-4, XP032808403.
Wang, Jian-Gang et al.,"Person recognition by fusing palmprint and palm vein images based on "Laplacianpalm" representation", Pattern Recognition, Elsevier, GB, vol. 41, No. 5, Dec. 3, 2007, pp. 1514-1527, XP022472687.
Lin, Sen et al.,"Palmprint and Palm Vein Multimodal Fusion Biometrics Based on MMNBP", Sep. 21, 2016, Network and Parallel Computing; [Lecture Notes in Computer Science; Lect. Notes Computer], Spring International Publishing, Cham, pp. 326-336, XP047358517.
Sun et al., "Deep Convolutional Network Cascade for Facial Point Detection", In Proceedings of the 2013 IEEE Conference on Computer Vision and Pattern Recognition (CVPR), pp. 3476-3483 (8 pages), 2013.

\* cited by examiner

BIOMETRIC INFORMATION PROCESSING DEVICE, BIOMETRIC INFORMATION PROCESSING METHOD AND NON-TRANSITORY COMPUTER-READABLE RECORDING MEDIUM

CROSS-REFERENCE TO RELATED APPLICATION

This application is based upon and claims the benefit of priority of the prior Japanese Patent Application No. 2016-106534, filed on May 27, 2016, the entire contents of which are incorporated herein by reference.

FIELD

A certain aspect of embodiments described herein relates to a biometric information processing device, a biometric information processing method and a non-transitory computer-readable recording medium.

BACKGROUND

In vein authentication, an appropriate vein image is easily obtained by stabilizing the posture of a region of a living body with a guide. Recently, a vein authentication function is installed in a portable device, but the use of the device along with the guide loses portability. It is therefore hoped that the authentication is carried out by a movement that naturally holds the region of the living body over the portable device. However, it is difficult to stabilize a position of the region of the living body against a sensor, and hence a photographing range and a photographing point vary for each photographing. For this reason, it is considered that a vein pattern of the whole regions of the living body is enrolled, a part of the whole regions is photographed at the time of comparison and the comparison (partial authentication) of the part of the whole regions is performed (see Japanese Laid-open Patent Publication No. 2012-234440).

SUMMARY

According to an aspect of the present invention, there is provided a biometric information processing device including: a memory; a processor coupled to the memory and the processor configured to: extract a surface pattern and a blood vessel pattern of a living body from a biometric image; extract a feature point of the surface pattern; and extract a feature of the blood vessel pattern corresponding to a position of the feature point.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

DESCRIPTION OF EMBODIMENTS

It is considered that, in the vein authentication, the vein pattern has no information which become a clue of its position, and therefore the position of the vein pattern is estimated from an outline of the biometric portion. However, outline information cannot be used by the partial authentication, so that a comparison region cannot be decided promptly. It is considered to scan a partial pattern on a whole pattern of the region of the living body, find a corresponding position and perform the comparison. However, a processing time increases by scanning the whole pattern.

Hereinafter, a description will be given of an embodiment with reference to drawings.

First Embodiment

Figure 1A:
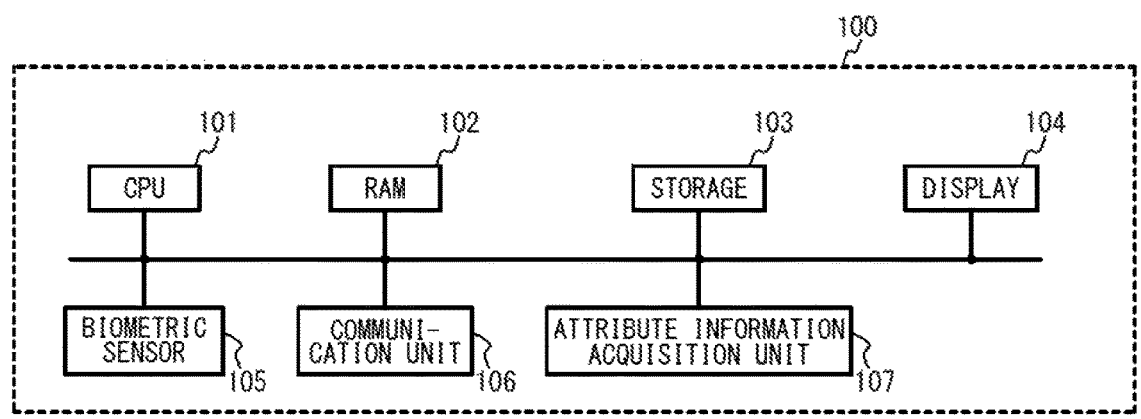
FIG. 1A is a block diagram illustrating the hardware configuration of a biometric authentication device according to a first embodiment.
Figure 1B:
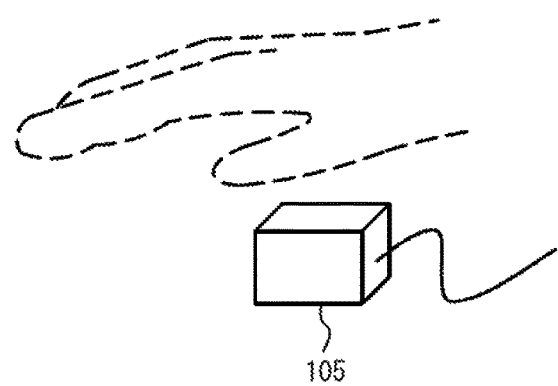
FIG. 1B is a schematic diagram of a biometric sensor.

FIG. 1A is a block diagram illustrating the hardware configuration of a biometric authentication device 100 according to a first embodiment. FIG. 1B is a schematic diagram of a biometric sensor 105 mentioned later. With reference to FIG. 1A, the biometric authentication device 100 includes a CPU 101, a RAM 102, a storage 103, a display 104, a biometric sensor 105, a communication unit 106, an attribute information acquisition unit 107, and so on. These components are connected to each other via a bus.

The CPU 101 is a central processing unit. The CPU 101 includes one or more cores. The RAM (Random Access Memory) 102 is a volatile memory that temporarily stores programs which the CPU 101 executes, and data which the CPU 101 processes.

The storage 103 is a nonvolatile storage. For example, a ROM (Read Only Memory), a SSD (Solid State Drive) such as a flash memory, and a hard disk driven by a hard disk drive can be used as the storage 103. A biometric authentication program according to the present embodiment is stored into the storage 103. The display 104 is a liquid crystal display, an electroluminescent panel or the like, and displays a result of each processing mentioned later.

The biometric sensor 105 is a sensor for acquiring biometric information of a user, and acquires a palm image of the user in a non-contact manner in the present embodiment. As illustrated in FIG. 1B, the biometric sensor 105 is a CMOS (Complementary Metal Oxide Semiconductor) camera as an example. The biometric sensor 105 can acquire a surface pattern such as wrinkles of the palm based on information of a visible light or a near-infrared ray, for example. Further, the biometric sensor 105 can acquire a blood vessel pattern such as a vein pattern with the use of the near-infrared ray. The palm image preferably includes the whole of the palm including a finger-tip, but may include only a range from a wrist to the middle of the finger.

The communication unit 106 is a connection interface to a LAN (Local Area Network), for example. The attribute information acquisition unit 107 is an input device such as a keyboard or a mouse, and is used to input an ID or a user name and a password for identifying a user, for example.

The biometric authentication program stored into the storage 103 is executably developed in the RAM 102. The CPU 101 executes the biometric authentication program developed in the RAM 102. Thereby, each processing is performed by the biometric authentication device 100. By executing the biometric authentication program, enrollment processing and authentication processing are performed.

In the enrollment processing, a feature acquired from the palm image acquired by the biometric sensor 105 is associated with each user, and the feature associated with each user is enrolled in a database. In the present embodiment, the blood vessel pattern extracted from the palm image is enrolled in the database as the feature. In the authentication processing, a comparison feature acquired by the biometric sensor 105 is compared with an enrollment feature enrolled in the database. In the present embodiment, when a similarity degree between the vein pattern acquired at the time of the authentication processing and the vein pattern enrolled in the database is equal to or more than a threshold value as an example, it is determined that the user is the same as an enrolled user. The details of the enrollment processing and the authentication processing are mentioned later.

Figure 2:
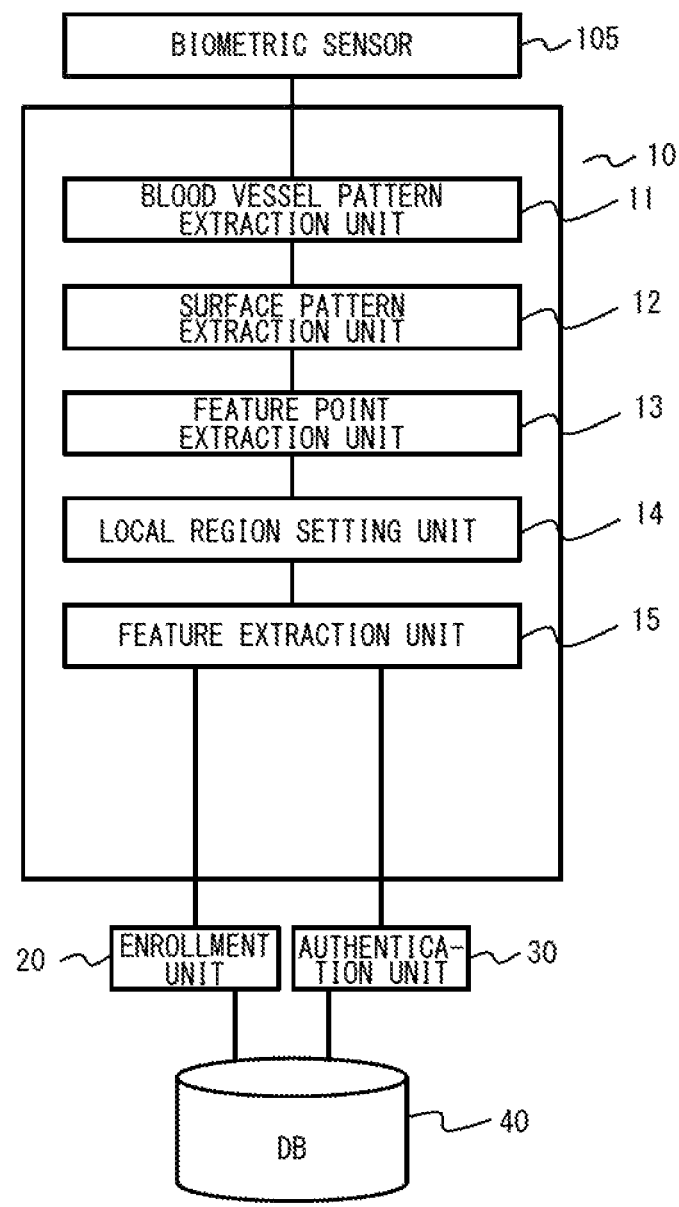
FIG. 2 is a block diagram of respective functions achieved by the execution of a biometric authentication program.

FIG. 2 is a block diagram of respective functions achieved by the execution of the biometric authentication program. An extraction unit 10, an enrollment unit 20, an authentication unit 30 and a database 40 are achieved by the execution of the biometric authentication program. The vein extraction unit 10 includes a function as a biometric information processing device. Therefore, a program achieving the extraction unit 10 included in the biometric authentication program includes a function as a biometric information processing program. The extraction unit 10 includes a blood vessel pattern extraction unit 11, a surface pattern extraction unit 12, a feature point extraction unit 13, a local region setting unit 14 and a feature extraction unit 15. In the example of FIGS. 1A, 1B and 2, the biometric authentication device 100 is a stand-alone terminal, but not limited to this. In the present embodiment, the biometric authentication device 100 is also applicable to a client-server system, for example. In the present embodiment, a description will be given of an example of the stand-alone terminal for convenience of explanation.

Figure 3:
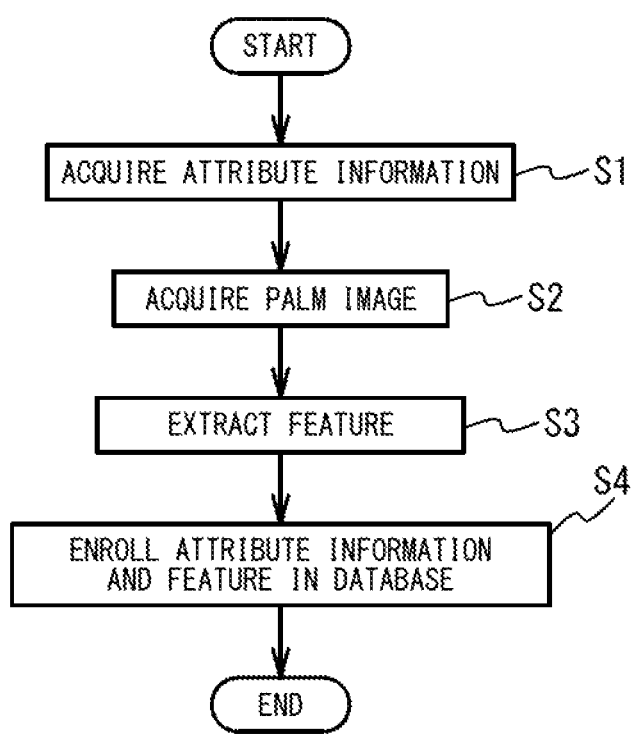
FIG. 3 is a flowchart illustrating details of enrollment processing.

(Enrollment Processing) FIG. 3 is a flowchart illustrating details of the enrollment processing. Hereinafter, a description will be given of the enrollment processing with reference to FIGS. 2 and 3. First, the attribute information acquisition unit 107 acquires attribute information of the user (step S1). Next, the biometric sensor 105 acquires the palm image of the user that holds a hand over the biometric sensor 105 (step S2). Next, the extraction unit 10 extracts the vein pattern as the feature from the palm image (step S3). Next, the enrollment unit 20 associates the attribute information acquired at step S1 with the feature extracted at step S3, and enrolls the attribute information and the feature in the database 40 (step S4). The feature enrolled at step S4 is referred to as the enrollment feature. By the above-mentioned processing, the enrollment processing is completed.

Figure 4:
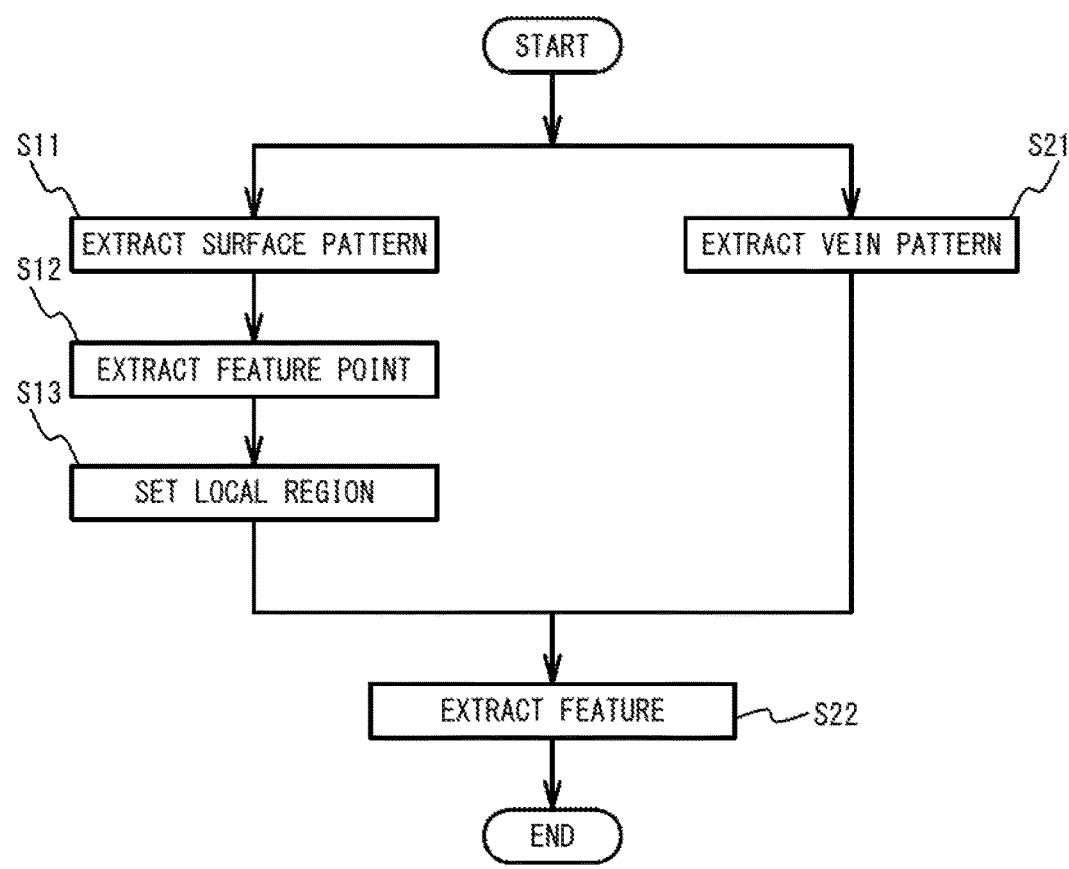
FIG. 4 is a flowchart illustrating the detail of step S3 in FIG. 3.
Figure 5:
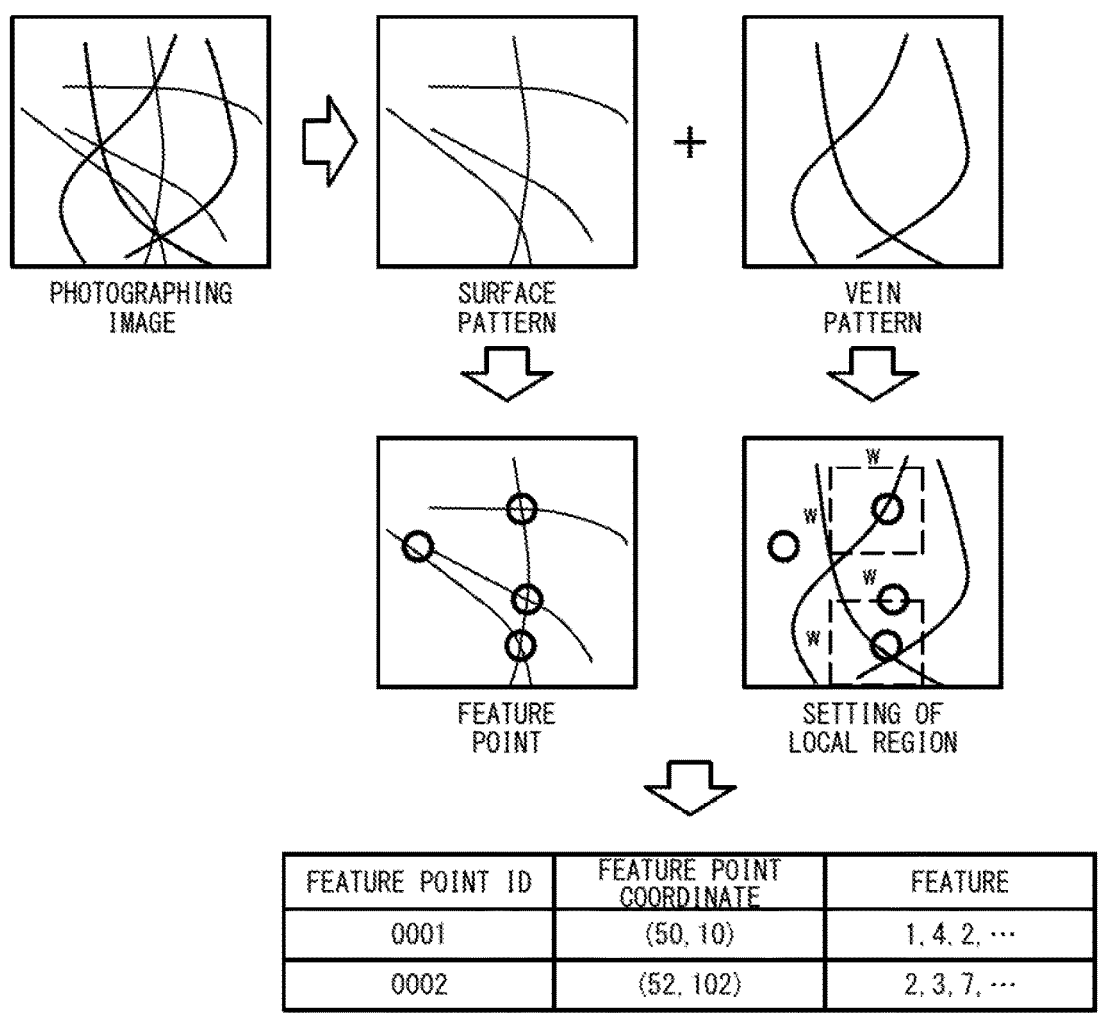
FIG. 5 is a diagram illustrating feature points and local regions extracted from a palm image.

FIG. 4 is a flowchart illustrating the detail of step S3 in FIG. 3. As illustrated in FIG. 4, the surface pattern extraction unit 12 extracts information reflected at the surface of the palm from the palm image acquired at step S2 to extract the surface pattern of the palm (step S11). FIG. 5 illustrates the palm image acquired at step S2 and the surface pattern extracted from the palm image.

Next, the feature point extraction unit 13 extracts positions of intersection points and end points of characteristic lines included in the surface pattern extracted at step S11 as feature points (step S12). As illustrated in FIG. 5, in the extracted surface pattern, unevenness of the surface is expressed as a two-dimensional image. Therefore, in the two-dimensional image, places far from the biometric sensor 105 are displayed blackly and near places are displayed whitely. The feature point extraction unit 13 performs binarization processing for the two-dimensional image to extract places (a wrinkle region of the surface) becoming black locally. The feature point extraction unit 13 thins images acquired by the binarization processing to generate line images each having a width of 1 px (pixel), and extracts the positions of the intersection points and the end points of the line images as the feature points. The feature points to be extracted are not only the intersection points and the end points, and may be singular points in which a curvature of each extracted thin line is large. Moreover, the feature point extraction unit 13 may store not only the positions of the feature points but also information on types and directions, as information on the feature points.

Next, the local region setting unit 14 sets a local region to extract the feature based on each of the feature points extracted at step S12 (step S13). For example, the local region setting unit 14 sets a square region where a length of one side is "W" and the extracted feature point is put on the center, as the local region. For example, the length of "W" is around 10-20% of a size of the palm image. The local region is a region set to extract the feature from the vein pattern, but not a region based on the vein pattern. Therefore, the vein pattern having enough information might not exist in the local region. In this case, there is few feature to be extracted and there is a possibility that a discriminative performance enough for the authentication cannot be expected. For this reason, the local region setting unit 14 counts pixels of the vein pattern included in the image representing the vein pattern corresponding to the square region where the feature point is put on the center, and calculates an existence ratio of the vein in the local region. When the existence ratio of the vein is equal to or more than a threshold value, the local region setting unit 14 adopts the square region as the local region for extracting the feature. When the existence ratio of the vein is less than the threshold value, the local region setting unit 14 does not adopt the square region as the local region. The local region setting unit 14 assigns a feature point ID as an identifier of each local region.

On the contrary, the blood vessel pattern extraction unit 11 extracts the vein pattern from the palm image acquired at step S2 (step S21). In FIG. 5, the extracted vein pattern is illustrated. The feature extraction unit 15 extracts the feature from a local image of the vein pattern corresponding to the local region set at step S13 (step S22). The feature can be extracted with the use of a general image recognition technique. For example, a statistical feature (a mean, a dispersion and so on of pixel values) in the local image of the vein pattern, Local Binary Pattern (LBP), SIFT/SURF, ORB, BRISK, D-Nets, KAZE or a technique using the combination thereof can be used. The feature extraction unit 15 associates a feature point coordinate and the feature (vector) with the feature point ID, as illustrated in FIG. 5.

Figure 6:
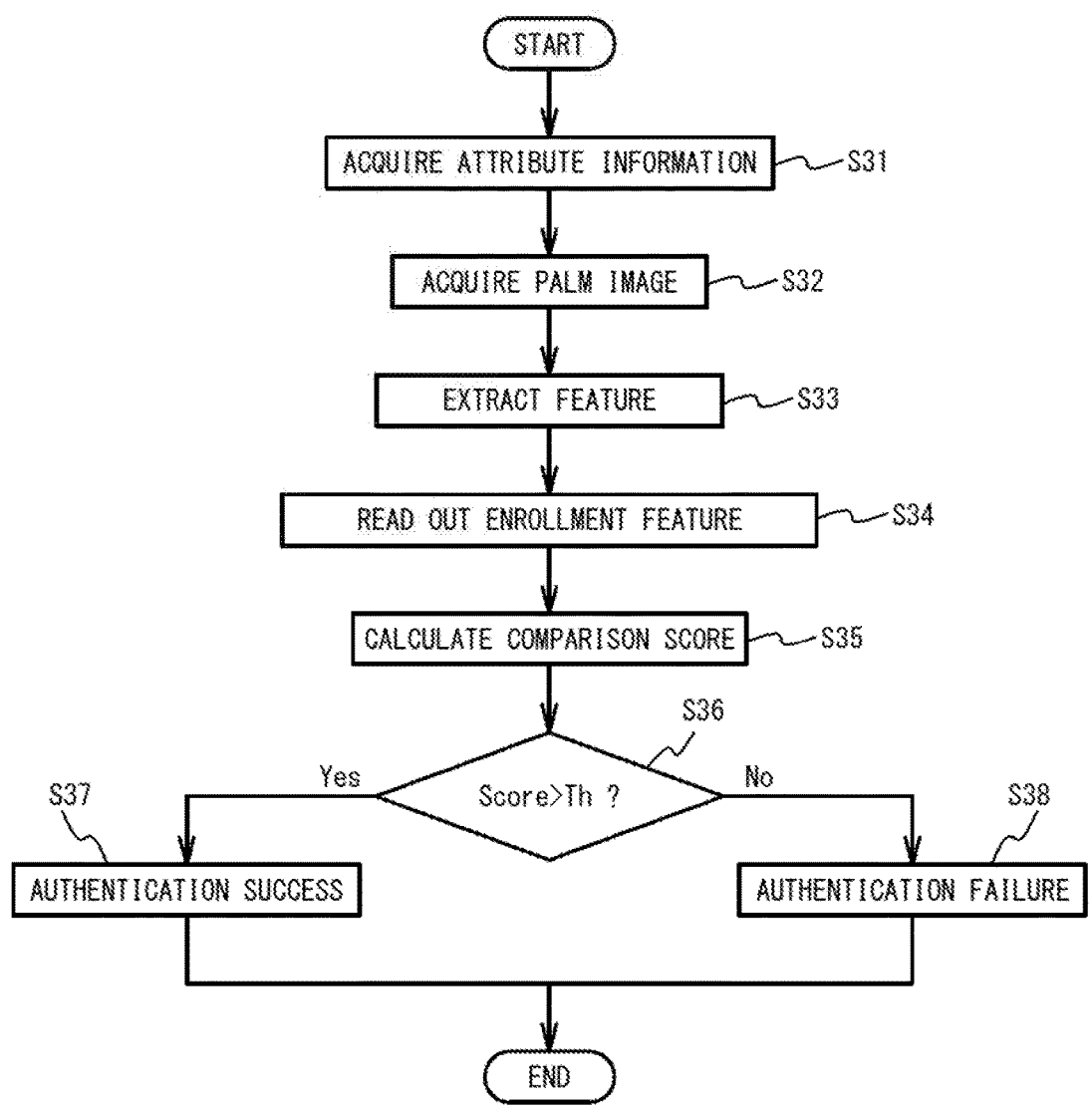
FIG. 6 is a flowchart illustrating details of authentication processing.

(Authentication Processing) Next, a description will be given of the authentication processing. FIG. 6 is a flowchart illustrating details of the authentication processing. As illustrated in FIG. 6, steps S31 to S33 are the same as steps S1 to S3 of FIG. 3. The feature acquired at step S33 is referred to as the comparison feature. After the execution of step S33, the authentication unit 30 reads out the enrollment feature identical with the attribute information acquired at step S31 from the database 40 (step S34).

Next, the authentication unit 30 calculates a similarity degree between the enrollment feature read out at step S34 and the comparison feature, as a comparison score (step S35). For example, the authentication unit 30 sequentially calculates a similarity degree between a feature included in the comparison feature and each feature included in the enrollment feature, and calculates a maximum similarity degree as a similarity degree of the feature included in the comparison feature. The authentication unit 30 calculates a similarity degree with respect to another feature included in the comparison feature in the same way. The authentication unit 30 calculates an average of the acquired similarity degrees as the comparison score. Alternatively, the authentication unit 30 may use geometric information that a group of feature points has. Specifically, the authentication unit 30 calculates a relative position relation of each feature point with the use of the coordinates of the feature points. The authentication unit 30 compares the relative position relation of each feature point of the comparison feature with the relative position relation of each feature point of the enrollment feature, which make it possible to acquire a corresponding relation between both feature points. By comparing the feature of the feature point included in the comparison feature with the feature of a corresponding feature point included in the enrollment feature, it is possible to reduce a calculation amount.

The authentication unit 30 determines whether the comparison score exceeds a threshold Th (step S36). When the determination of step S36 is YES, the authentication unit 30 outputs a signal indicative of authentication success (step S37). When the determination of step S36 is NO, the authentication unit 30 outputs a signal indicative of authentication failure (step S38). After the execution of steps S37 and S38, the execution of the flowchart is completed.

According to the present embodiment, the feature point of the surface pattern is used as information for setting the local region smaller than the palm image. The blood vessel pattern has few feature points such as the intersection points and the end points of the characteristic lines, and hence it is hard to extract the feature points which become a clue of its position. On the contrary, many intersection points and many end points of the characteristic lines are included in the surface pattern. Therefore, the setting of the local region is facilitated by using the surface pattern. The feature is extracted from the blood vessel pattern every local regions. The feature of each local region enrolled at the time of the enrollment processing is compared with the feature of each local region extracted at the time of the authentication processing. This method does not need to scan the partial pattern for comparison from the whole palm image, so that a time necessary for deciding a region used for comparison is shortened. As described above, according to the present embodiment, it is possible to acquire the biometric information to be used for partial authentication at high speed.

The present embodiment explains one-on-one authentication that specifies the enrollment feature of a comparison object by acquiring the attribute information at the time of the authentication processing, but the present embodiment is not limited to this. The present embodiment can be applied to one-to-many authentication that compares the comparison feature with a plurality of enrollment features without acquiring the attribute information at the time of the authentication processing. The same applies to the following examples.

Figure 7:
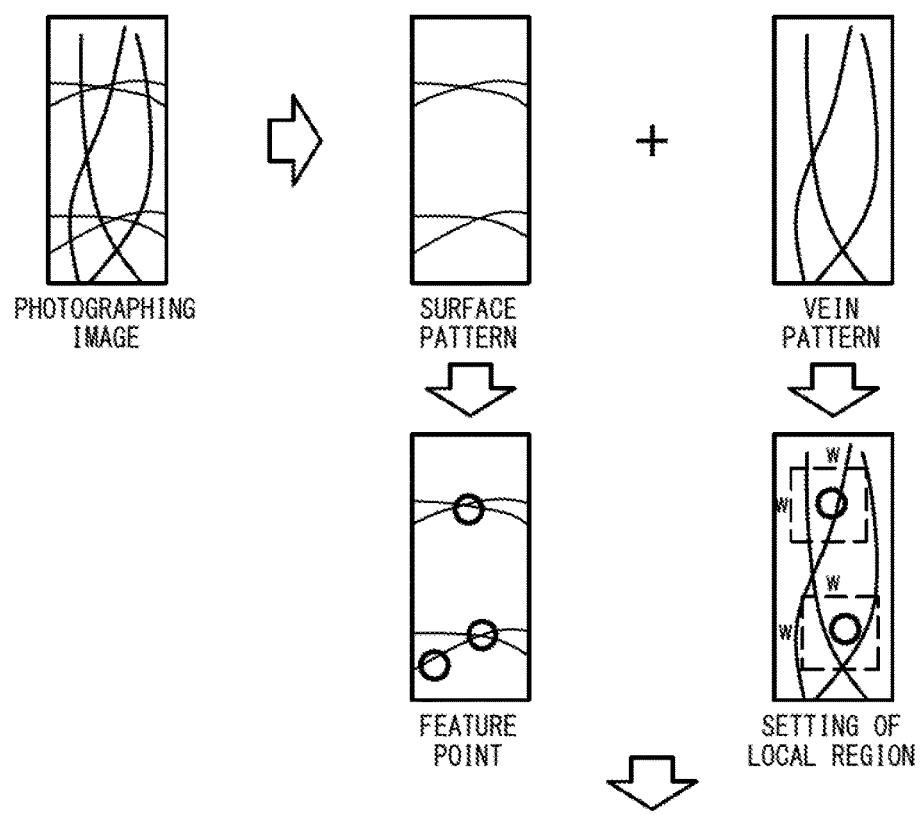
FIG. 7 is a diagram illustrating the feature points and the local regions extracted from a finger image.

(Variation 1) The feature can be extracted from the blood vessel pattern of a finger other than the blood vessel pattern of the palm, for example. FIG. 7 is a diagram illustrating a finger image of any one of fingers acquired by the biometric sensor 105. The surface pattern extraction unit 12 extracts information reflected at the surface of the finger from the acquired finger image to extract the surface pattern of the finger. Moreover, in FIG. 7, the extracted surface pattern is illustrated. The surface pattern is wrinkles of a joint of the finger.

The feature point extraction unit 13 extracts positions of intersection points and end points of characteristic lines included in the extracted surface pattern, as the feature points. As illustrated in FIG. 7, in the extracted surface pattern, unevenness of the surface is expressed as the two-dimensional image. Therefore, in the two-dimensional image, places far from the biometric sensor 105 are displayed blackly and near places are displayed whitely. The feature point extraction unit 13 performs binarization processing for the two-dimensional image to extract places (the wrinkle region of the surface) becoming black locally. The feature point extraction unit 13 thins images acquired by the binarization processing to generate line images each having a width of 1 px (pixel), and extracts the positions of the intersection points and the end points of the line images as the feature points. The feature points to be extracted are not only the intersection points and the end points, and may be singular points in which a curvature of each extracted thin line is large. Moreover, the feature point extraction unit 13 may store not only the positions of the feature points but also information on types and directions, as information on the feature points.

The local region setting unit 14 sets the local region to extract the feature based on each of the extracted feature points. For example, the local region setting unit 14 sets the square region where the length of one side is "W" and the extracted feature point is put on the center, as the local region. For example, the length of "W" is around 10-20% of an image size. The local region setting unit 14 counts the pixels of the blood vessel pattern included in the image representing the blood vessel pattern corresponding to the square region where the feature point is put on the center, and calculates the existence ratio of the blood vessel in the local region. When the existence ratio of the blood vessel is equal to or more than the threshold value, the local region setting unit 14 adopts the square region as the local region for extracting the feature. When the existence ratio of the vein is less than the threshold value, the local region setting unit 14 does not adopt the square region as the local region. The local region setting unit 14 assigns the feature point ID as the identifier of each local region.

The blood vessel pattern extraction unit 11 extracts the blood vessel pattern from the finger image. In FIG. 7, the vein pattern is illustrated as the blood vessel pattern. The feature extraction unit 15 extracts the feature from the local image of the blood vessel pattern corresponding to the set local region, as illustrated in FIG. 7. The feature extraction unit 15 associates the feature point coordinate and the feature (vector) with the feature point ID, as illustrated in FIG. 7.

Figure 8:
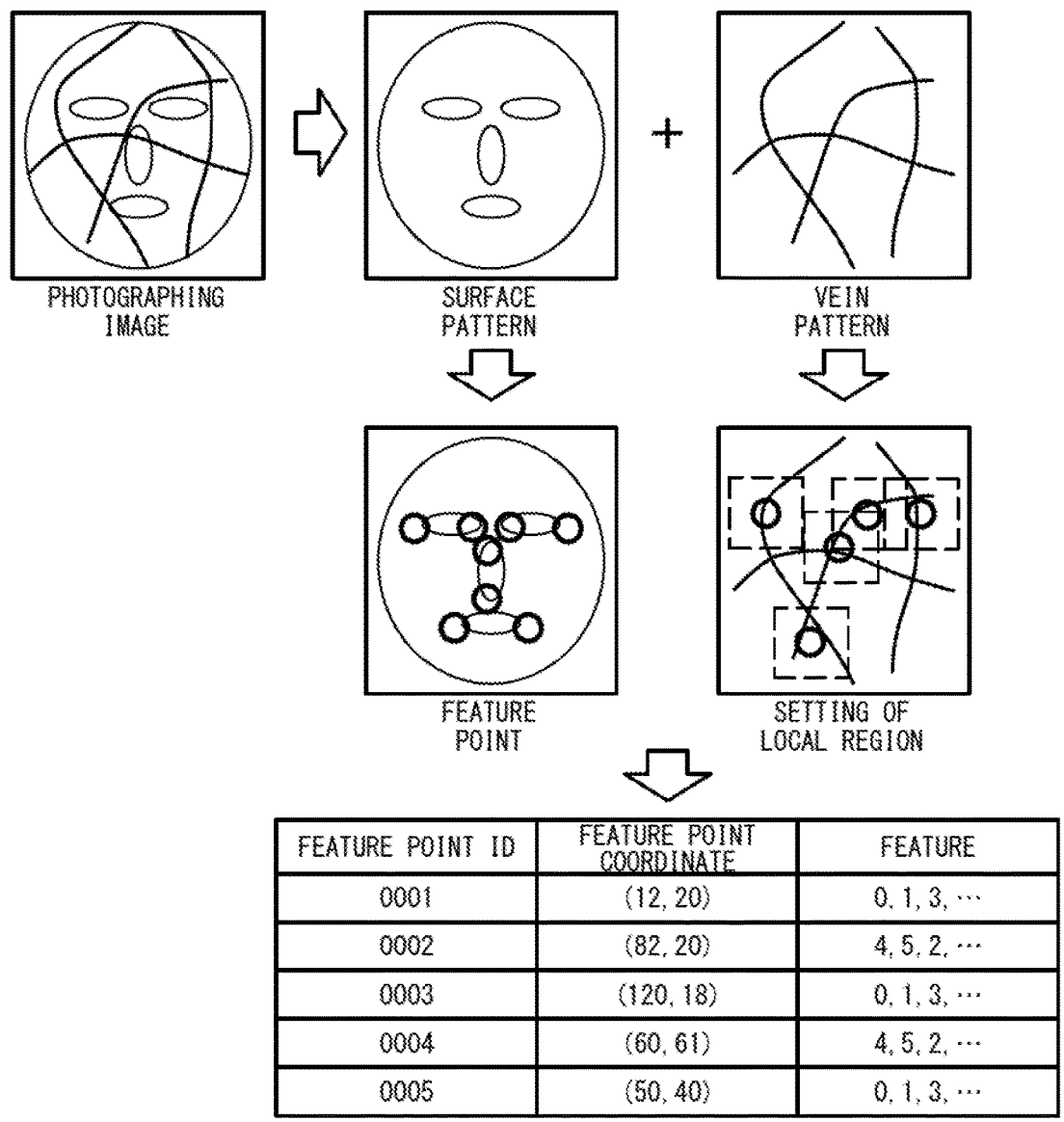
FIG. 8 is a diagram illustrating the feature points and the local regions extracted from a face image.

(Variation 2) Alternatively, the feature can be extracted from the blood vessel pattern of a face. FIG. 8 is a diagram illustrating a face image acquired by the biometric sensor 105. The surface pattern extraction unit 12 extracts information reflected at the surface of the face from the acquired face image to extract the surface pattern of the face. Moreover, in FIG. 8, the extracted surface pattern is illustrated. The surface pattern is outlines such as eyes, a nose and a mouth.

The feature point extraction unit 13 extracts the positions of characteristic points included in the extracted surface pattern, as the feature points. For example, as illustrated in FIG. 8, the feature point extraction unit 13 can extract points on the outlines such as the eyes, the nose and the mouth in which a curvature is equal to or more than a threshold value, as the feature points. As a technique to extract the outlines such as the eyes, the nose and the mouth, a Laplacian filter or Canny edge detection can be used. For example, the feature points of the face can be detected by performing machine learning of the local image of the corresponding position beforehand. For example, a method described in "Yi Sun et al., "Deep Convolutional Network Cascade for Facial Point Detection", In Proceedings of the 2013 IEEE Conference on Computer Vision and Pattern Recognition (CVPR), pp. 3476-3483, 2013" can be used.

The local region setting unit 14 sets the local region to extract the feature based on each of the extracted feature points. For example, the local region setting unit 14 sets the square region where the length of one side is "W" and the extracted feature point is put on the center, as the local region. For example, the length of "W" is around 10-20% of an image size. The local region setting unit 14 counts the pixels of the blood vessel pattern included in the image representing the blood vessel pattern corresponding to the square region where the feature point is put on the center, and calculates the existence ratio of the blood vessel in the local region. When the existence ratio of the blood vessel is equal to or more than the threshold value, the local region setting unit 14 adopts the square region as the local region for extracting the feature. When the existence ratio of the vein is less than the threshold value, the local region setting unit 14 does not adopt the square region as the local region. The local region setting unit 14 assigns the feature point ID as the identifier of each local region.

The blood vessel pattern extraction unit 11 extracts the blood vessel pattern from the face image. In FIG. 8, the vein pattern extracted as the blood vessel pattern is illustrated. The feature extraction unit 15 extracts the feature from the local image of the blood vessel pattern corresponding to the set local region, as illustrated in FIG. 8. The feature can be extracted with the use of the general image recognition technique. The feature extraction unit 15 associates the feature point coordinate and the feature (vector) with the feature point ID, as illustrated in FIG. 8.

(Variation 3) In each example mentioned above, the feature is extracted from the blood vessel pattern. Moreover, the feature may be extracted from the surface pattern. For example, the feature extraction unit 15 extracts the feature from the surface pattern in the local region. The coordinate and the direction of the end points and branch points included in the wrinkles of the palm or the wrinkles of the joint of the finger, and connection information of two branch points can be extracted as the features. The enrollment unit 20 associates the attribute information of the user, the feature extracted from the blood vessel pattern and the feature extracted from the surface pattern with each other, and enrolls the attribute information and the features in the database 40. The authentication unit 30 compares the feature extracted from the blood vessel pattern and the feature extracted from the surface pattern at the time of the authentication with each feature enrolled in the database 40. According to the present variation, both of the features of the blood vessel pattern and the surface pattern are used, so that authentication accuracy improves.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. A biometric information processing device comprising:
a memory;
a processor coupled to the memory and the processor configured to:
extract a surface pattern and a blood vessel pattern of a living body from a biometric image;
extract a feature point of the surface pattern;
set a region that contains the feature point, where the region being smaller than the biometric image; and
extract a feature of the blood vessel pattern in the region,
wherein pixels representing the blood vessel pattern exist in the region with a ratio that is equal to or more than a threshold value.

2. The biometric information processing device as claimed in claim 1, wherein
the processor extracts a line from the surface pattern, and extracts, as the feature point, any one of an end point of the line, an intersection point of the line and a point having a curvature equal to or more than a threshold value.

3. The biometric information processing device as claimed in claim 1, wherein
the processor extracts a feature of the surface pattern in the region.

4. The biometric information processing device as claimed in claim 1, wherein
the processor compares the extracted feature with a feature enrolled beforehand.

5. A biometric information processing method implemented by a computer, the biometric information processing method comprising:
extracting a surface pattern and a blood vessel pattern of a living body from a biometric image;
extracting a feature point of the surface pattern;
setting a region that contains the feature point, where the region being smaller than the biometric image; and
extracting a feature of the blood vessel pattern in the region,
wherein pixels representing the blood vessel pattern exist in the region with a ratio that is equal to or more than a threshold value.

6. The biometric information processing method as claimed in claim 5, wherein
the extracting the feature point extracts a line from the surface pattern, and extracts, as the feature point, any one of an end point of the line, an intersection point of the line and a point having a curvature equal to or more than a threshold value.

7. The biometric information processing method as claimed in claim 5, wherein the extracting the feature extracts a feature of the surface pattern in the region.

8. The biometric information processing method as claimed in claim 5, further comprising:
comparing the feature extracted by the extracting the feature with a feature enrolled beforehand.

9. A non-transitory computer-readable recording medium storing a program that causes a computer to execute a process, the process comprising:
extracting a surface pattern and a blood vessel pattern of a living body from a biometric image;
extracting a feature point of the surface pattern;
setting a region that contains the feature point, where the region being smaller than the biometric image; and
extracting a feature of the blood vessel pattern in the region,
wherein pixels representing the blood vessel pattern exist in the region with a ratio that is equal to or more than a threshold value.

10. The non-transitory computer-readable recording medium as claimed in claim 9, wherein
the extracting the feature point extracts a line from the surface pattern, and extracts, as the feature point, any one of an end point of the line, an intersection point of the line and a point having a curvature equal to or more than a threshold value.

11. The non-transitory computer-readable recording medium as claimed in claim 9, wherein
the extracting the feature extracts a feature of the surface pattern in the region.

12. The non-transitory computer-readable recording medium as claimed in claim 9, further comprising:
comparing the feature extracted by the extracting the feature with a feature enrolled beforehand.

* * * * *